(12) United States Patent  (10) Patent No.: US 8,382,294 B2
Hua et al.  (45) Date of Patent: Feb. 26, 2013

(54) METHOD AND APPARATUS FOR DISPLAYING AN IMAGE ON A COMMUNICATION DEVICE

(75) Inventors: Shijie Hua, Kul (MY); Khai Jin Choo, Penang (MY); Seng Huan Chuah, Pulau Pinang (MY); Wey Chien Heng, Selangor (MY); Boon Hoong Ooi, Penang (MY); Shook Gunn Tan, Penang (MY)

(73) Assignee: Motorola Solutions, Inc., Schaumburg, IL (US)

( * ) Notice: Subject to any disclaimer, the term of this patent is extended or adjusted under 35 U.S.C. 154(b) by 483 days.

(21) Appl. No.: 12/771,794

(22) Filed: Apr. 30, 2010

(65) Prior Publication Data

US 2011/0267257 A1  Nov. 3, 2011

(51) Int. Cl.
*G03B 21/14* (2006.01)
(52) U.S. Cl. ............ 353/119; 353/30; 353/33; 353/38; 353/39; 353/98; 353/121; 353/122; 345/1.1
(58) Field of Classification Search .............. 353/15, 353/28, 30, 33, 101, 100, 122, 119, 38, 39, 353/43, 21; 455/566, 567, 575.3, 575.4; 349/7, 9, 11, 13, 16, 57, 58, 62, 63; 359/630–634; 345/1.1, 1.3, 7–9, 156–173, 87; 348/744, 348/745, 756, 787, 788, 794, 795, 211.13, 348/383, 552
See application file for complete search history.

(56) References Cited

U.S. PATENT DOCUMENTS

| 6,125,286 | A | 9/2000 | Jahagirdar et al. |
| 6,839,101 | B2* | 1/2005 | Shima ............................. 349/58 |
| 7,068,258 | B2* | 6/2006 | Cone et al. .................... 345/169 |
| 7,089,040 | B2* | 8/2006 | Iwabuchi et al. ............. 455/566 |
| 7,466,994 | B2* | 12/2008 | Pihlaja et al. ................. 455/566 |
| 7,619,826 | B2 | 11/2009 | Watanabe et al. |
| 7,714,942 | B2* | 5/2010 | Kong et al. .................... 348/744 |
| 7,862,185 | B2* | 1/2011 | Noba ............................. 353/119 |
| 7,862,190 | B2* | 1/2011 | Higashiyama ................. 362/88 |
| 2002/0113912 | A1* | 8/2002 | Wright et al. ................... 349/13 |
| 2004/0145564 | A1* | 7/2004 | Duarte et al. ................. 345/156 |
| 2008/0212041 | A1* | 9/2008 | Koizumi et al. ............. 353/122 |
| 2008/0242375 | A1 | 10/2008 | Garcia et al. |
| 2010/0277665 | A1* | 11/2010 | Kuo et al. ....................... 349/58 |

* cited by examiner

*Primary Examiner* — Georgia Y Epps
*Assistant Examiner* — Sultan Chowdhury
(74) *Attorney, Agent, or Firm* — Barbara R. Doutre

(57) ABSTRACT

A method and apparatus for displaying an image on a communication device are provided. The communication device is formed of a housing (305) having a plurality of surfaces and includes an electronically controlled display (310) coupled to one of the surfaces. The housing further includes a reflecting device (345) for reflecting an image from the display (310) onto another, non-electronic, display (320) located on another surface of the housing. The image is thus viewable on both surfaces of the housing.

33 Claims, 5 Drawing Sheets

METHOD AND APPARATUS FOR DISPLAYING AN IMAGE ON A COMMUNICATION DEVICE

FIELD OF THE DISCLOSURE

The present disclosure relates generally to a communication device and more particularly to a method and apparatus for displaying an image on the communication device.

BACKGROUND

Conventional two-way portable radios are usually designed with a main display on a front panel to provide essential information to a user. Generally, the portable radio is carried in a holster or held by a belt clip. To view displayed information, the user must remove the radio from the holster or disengage the belt clip. Public safety personnel, such as fire fighters, police officers, rescue members, and the like, often wear gloves and other safety equipment that can make it difficult to remove the radio from the holster or disengage the belt clip. For example, during a mission critical task, the user may not be able to remove safety gloves to pull the radio from the holster or disengage the belt clip. Thus, two-way radio users especially those working in public safety and mission critical tasks would benefit from a display interface which provides information at a quick glance, without having to remove the radio from the holster or belt clip.

The challenge is designing a communication device having improved display viewing capability while providing maximum functionality under tight size and cost constraints.

Accordingly, there exists a need for a display in a two-way portable radio which will facilitate viewing the display without having to remove the radio from its holster or belt clip, preferably without increasing the cost and the design complexity of the radio.

BRIEF DESCRIPTION OF THE FIGURES

The accompanying figures where like reference numerals refer to identical or functionally similar elements throughout the separate views and which together with the detailed description below are incorporated in and form part of the specification, serve to further illustrate various embodiments and to explain various principles and advantages all in accordance with the present invention.

Figure 1A:
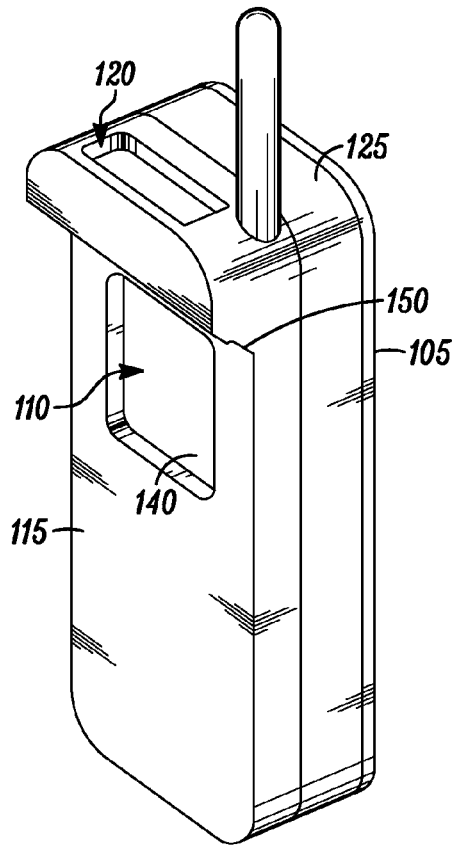
FIGS. 1A and 1B is a communication device in accordance with some embodiments.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

DETAILED DESCRIPTION

Before describing in detail embodiments that are in accordance with the present invention, it should be observed that the embodiments reside primarily in combinations of method, steps, and apparatus components related to displaying an image on a communication device. The method includes displaying a first image on a first portion of a display that is positioned on a first surface of a communication device. The first surface is the front surface of the communication device and the first image includes information requested by a user. The communication device then displays a second image on a second portion of the display. The second image may correspond to or be independent of the first image The communication device then reflects the second image onto a second surface of the communication device by positioning a reflecting surface between the second portion of the display and the second surface of the communication device. The orientation of the reflecting surface is such that the second image displayed on the second portion of the display is reflected towards the top surface. As such, the second image is viewable through the second surface. By using this method a user is able to view an image displayed on the second surface of the communication device without removing the communication device from a holster or disengaging a belt clip.

An apparatus is provided that displays an image on one of a surface of the apparatus. The apparatus includes a display having a first portion configured to display a first image and a second portion coupled to the first portion of the display. The second portion is configured to display a second image. The second image may correspond to or may be independent of the first image.

In addition, the apparatus also includes an optical guide and a top lens coupled to the optical guide. The optical guide reflects the second image onto a second surface of the apparatus, wherein the second surface is the top surface of the apparatus. The top lens is positioned at the top surface of the apparatus and displays the reflected second image. This apparatus combines the working operation of an optical guide as well as a display which will be reflected to the top surface. Design complexity of the apparatus is minimized as additional interconnects between the second display and a processor are eliminated, thereby reducing the overall cost of the apparatus.

The various embodiments can be implemented in a portable radio. The radio includes a housing having a lens and a liquid crystal display (LCD). The LCD is coupled to the housing and includes a first portion configured to display a first image and a second portion coupled to the first portion of the LCD. The second portion of the LCD is configured to display a second image.

The radio device also includes a prism-structure light guide positioned between the LCD and the lens of the housing. The prism-structure light guide includes an angular portion for reflecting an image displayed by the second portion of the LCD onto the prism-structure light guide thereby making the image viewable at the lens. Thus, by using this radio device a user is able to view an image displayed on the lens of the radio without removing the radio device from a holster or disengaging a belt clip.

In the description herein, numerous specific examples are given to provide a thorough understanding of various embodiments of the invention. The examples are included for illustrative purpose only and are not intended to be exhaustive or to limit the invention in any way. It should be noted that various equivalent modifications are possible within the spirit and scope of the present invention. One skilled in the relevant art will recognize, however, that an embodiment of the invention can be practiced with or without the apparatuses, systems, assemblies, methods, components mentioned in the description.

Figure 1B:
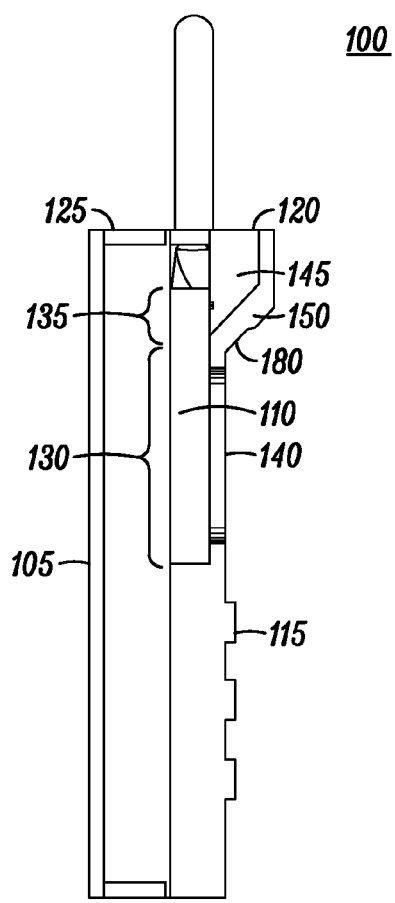

FIGS. 1A and 1B illustrate a communication device 100 in accordance with some embodiments. FIG. 1A is an isometric view of the communication device 100 and FIG. 1B is a side view of the communication device 100. The communication device 100 may be a portable radio, a radio, a mobile device, a Personal Digital Assistant (PDA), or the like. The communication device 100 includes a housing 105. All the components that are required for the functioning of the communication device 100 are coupled to the housing 105.

The communication device 100 in accordance with an embodiment has two displays 110, 120 coupled to the housing 105. In the example of FIGS. 1A and 1B, a first display 110 is positioned on a first surface 115 or the front surface 115 of the communication device 100. The first display 110 may be a Liquid Crystal Display (LCD), a plasma display, or the like. The second display 120 is placed on a second surface 125 or a top surface 125 of the communication device 100. The second display 120 is formed of a lens or a top surface of a prism and not an electronic display. The second display 120 may be referred as the lens or the top surface of the prism in the below description. It should be noted that the second display 120 is not limited only to the top surface 125, and can be placed on any surface such as the side surfaces or the back surface of the communication device 100. The communication device 100 is explained in more detail with reference to FIG. 1B.

As seen in FIG. 1B the first display 110 may be divided into two portions a first portion 130 and a second portion 135. The first portion 130 of the display 110 is visible to a user through a front lens 140, and displays images according to received input. The second portion 135 of the display 110 is enclosed within the housing 105 of the communication device 100, and the image displayed on the second portion 135 of the display 110 is not directly visible to the user. However, the user can see the images displayed on the second portion 135 of the display 110 through the top lens 120 positioned on the top surface 125 of the communication device 100. The image (i.e. non-inverted) displayed on the second portion 135 of the display 110 may be an image that is same as the image displayed on the first portion 130 of display 110, an image that is an inverted image of the image displayed on the first portion 130 of the display 110, an image containing information that is a subset of the information contained in the first portion 130 of the display 110, or an image that is different from the image displayed on the first portion 130 of the display 110.

Further, the housing 105 of communication device 100 includes a reflecting device 145 positioned between the second portion 135 of the display 110 and the second display 120. The reflecting device 145 comprises, for example, a prism light guide or a reflecting mirror. The reflecting device 145 may have multiple reflecting surfaces 150 depending on the image displayed on the second portion 135 of the display 110. For example, if the image displayed on the second portion 135 of the display 110 is an inverted image of the image displayed on the first portion 130 of the display 110, then an odd number of reflecting surfaces are present. However, if the image displayed on the second portion 135 of the display 110 is same as the image displayed on the first portion 130 of the display 110, then an even number of reflecting surfaces 150 are present. The multiple reflecting surfaces 150 in various scenarios help in displaying the image in such a way that is easily legible to the user. In addition, the reflecting surface 150 is an angular portion 180, having an angle such that the image displayed on the second portion 135 of the display is reflected onto the second surface 125 of the communication device 100. The angle of the angular portion 180 may be any angle that permits reflection of the image onto the second display 120 without clipping the image.

Operationally, when an image is displayed on the first portion 130 of the display 110, a corresponding image is formed on the second portion 135 of the display 110. The optical rays from the image, formed on the second portion 135 of the display 110, are incident on the reflecting surface 150 of a prism structure light guide. Further, by the optical phenomenon of total internal reflection the incident optical rays are reflected onto the top surface 125 of the communication device 100. Thus, the image formed on the second portion 135 of the display 110 is displayed on the top surface 125 or the second display 120 using at least one reflecting surface 150.

In some embodiments, the angular portion 180 of the housing 105 maybe adjustable, for example, in cases where the reflecting surface 150 is a mirror. In this case, it would be possible to change the angle of the mirror. The angle of the mirror could be any angle that reflects the image formed on the second portion 135 of the display 110 onto the top surface 125 of the communication device 100.

Thus, the device of FIGS. 1A and 1B hel
a user to easily view the image or information displayed on the first portion 130 of the display 110, on the second display 120. This device also hel
in reducing the design complexity as it is using only one electronic display 110, thereby eliminating the need to connect the second display 120 to a processor.

Figure 2:
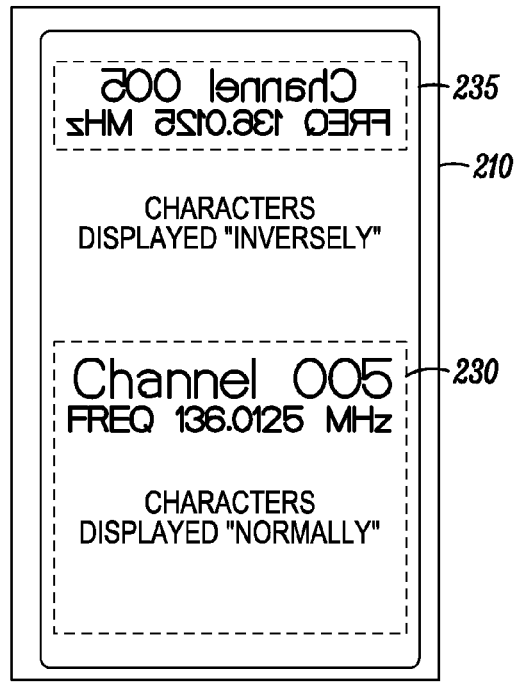
FIG. 2 is a screenshot of a display in accordance with an embodiment of the invention.

FIG. 2 illustrates a screen shot 200 of the first display 210. In accordance with an embodiment, the first display 210 includes a first portion 230 and a second portion 235 that is coupled to the first portion 230. In the embodiment of FIG. 2, the second portion 235 of the display 210 displays characters that are inverted to the characters displayed on the first portion 230 of the display 210. In another embodiment, the characters displayed on the second portion 235 are displayed normally i.e. are displayed in the same way as the characters displayed on the first portion 230. In yet another embodiment, the second portion 235 of the display 210 displays a subset of information displayed on first portion 230 of the display 210. For example, only the channel information or only the frequency information may be displayed on the second portion 235 of the display 210. In yet another embodiment, the information displayed on the second portion 235 of the display 210 may be independent of the information displayed on the first portion 230 of the display 210. For example, the information displayed on the first portion 230 may be only channel information whereas the information displayed on the second portion 235 may be only frequency information.

It should be noted here that whether the image displayed on the second portion 235 of the display 210 has to be same as, inverted of, a subset of, or dependent of the image displayed on the first portion 230 depends on the software of the communication device 200. In other words, the programming of the second portion 235 of the display 210 controls the image that is to be displayed on the second portion 235 of the display 210.

Figure 3:
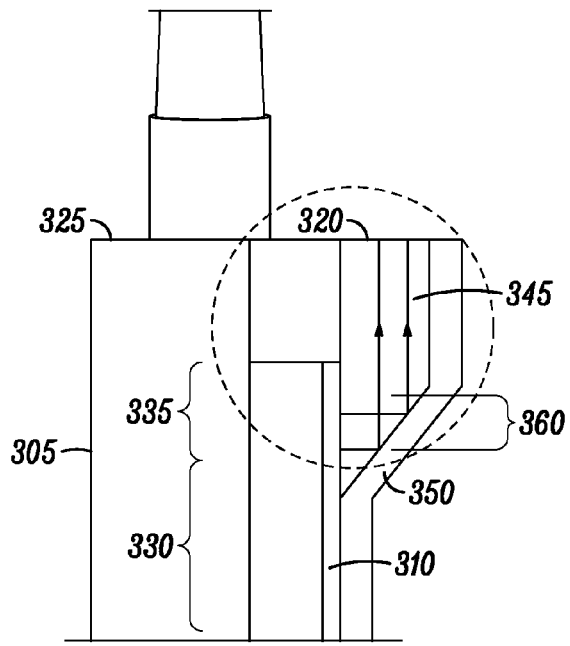
FIG. 3 illustrates light simulation results obtained when an image is reflected by a prism structure light guide in accordance with some embodiments.

FIG. 3 illustrates a representation of light simulation results obtained when an image is reflected by a prism light guide in accordance with some embodiments. FIG. 3 shows the portion of the housing 305 that includes the prism light guide 345 having an angled reflecting portion 350, the second portion 335 of the display 310, and the top surface 325 of the communication device which has the second display 320. In the example of FIG. 3, the second display 320 is the top surface of the prism light guide 345. Operationally, an image is displayed on the second portion 335 of the display 310. The image, in this example, will be an inverted image of the image displayed on the first portion 330 of the display 310. In the example of FIG. 3, the light rays 360 of the image displayed on the second portion 335 of the display 310 enter the prism light guide 345 at an angle greater than or equal to the critical angle. The critical angle is the angle of incidence of a light ray above which the total internal reflection occurs. Total internal reflection is an optical phenomenon that occurs when a ray of light strikes a medium boundary at an angle larger than a particular critical angle with respect to the normal to the surface. If the refractive index is lower on the other side of the boundary, no light can pass through and all of the light is reflected.

Thus, by the phenomenon of total internal reflection the light rays 360 are reflected towards the top surface 325 of the communication device 300. As a result, an image is formed which can be viewed from the top surface 325 of the prism light guide 345. Further, it should be noted that the image is formed at some depth below the top surface 325 of the prism light guide 345. This effect is called tunnel effect and occurs because the distance between the angled reflecting portion 350 of the prism light guide 345 and the top surface 325 of the prism light guide 345 is large Therefore, to reduce tunnel effect, the distance between the angled reflecting portion 350 of the prism light guide 345 and the top surface 325 of the prism light guide 345 is reduced to as small as possible.

Therefore, by combining the working operation of the prism light guide and the display, the image can be displayed on the top surface 325 of the prism light guide 345 which is easily viewable at the top surface 325 of the communication device 300.

Figure 4:
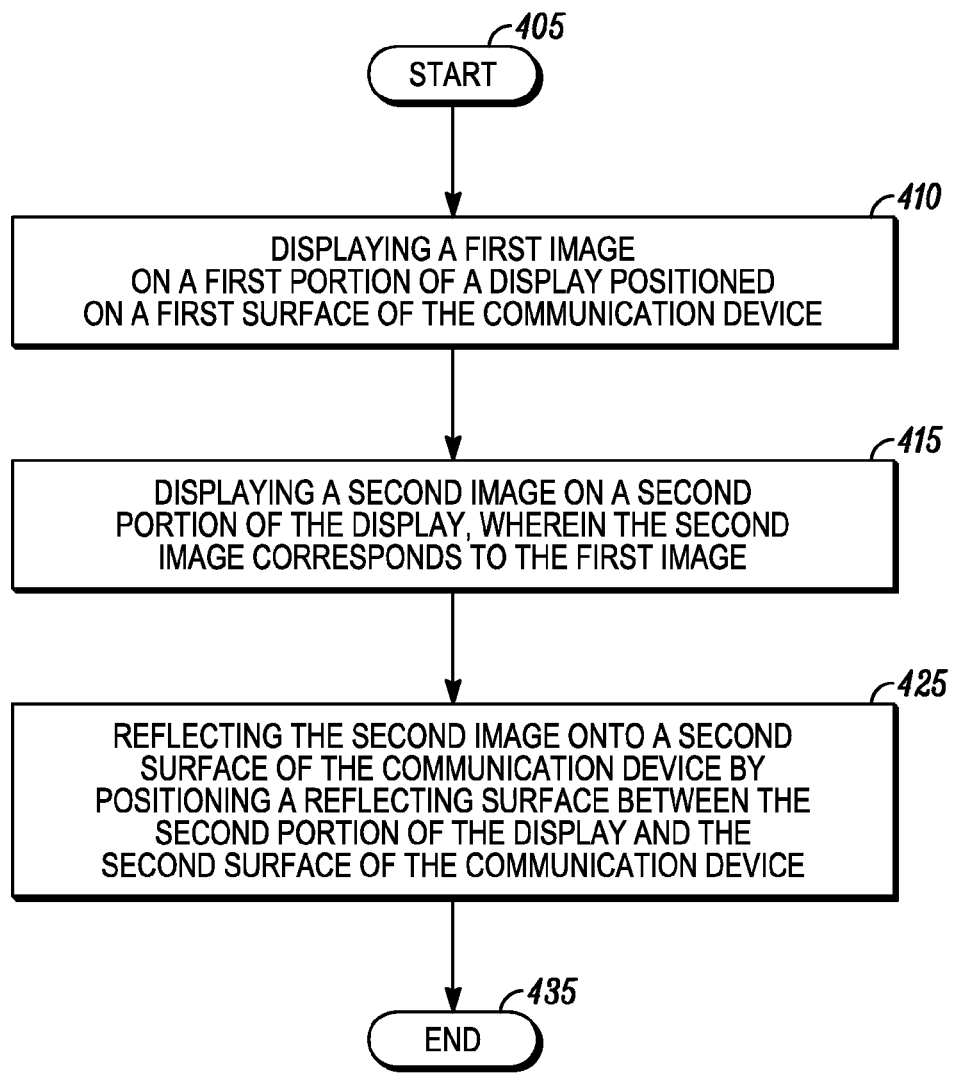
FIG. 4 illustrates a flowchart of a method for projecting an image on a communication device in accordance with some embodiments.

FIG. 4 illustrates a flowchart of a method for displaying an image on a communication device in accordance with some embodiments. The method commences 405 with a user entering or receiving an input to the communication device. As a result, the communication device displays 410 a first image on a first portion of a display positioned on a first surface of the communication device The first image can be viewed through the front lens of the communication device. While the first surface is shown as the front surface of the communication device, it is understood that in some embodiments the first surface can be any surface of the communication device.

After displaying the first image, the communication device displays 415 a second image on a second portion of the display. The second image corresponds to the first image. The second image may be an image that is same as the first image, an image that is an inverted image of the first image, an image that is a subset of the second image, or an image that contains information different from the information contained in the first image. Further, the second portion of the display is coupled to the first portion of the display and is positioned inside the communication device.

Further to displaying the second image, the second image is reflected 425 onto a second surface of the communication device. The second image is reflected by positioning a reflecting surface between the second portion of the display and the second surface of the communication device. In the example of FIG. 4, the second surface is the top surface of the communication device and the reflecting surface maybe an angled surface of prism or a mirror. Additionally, multiple reflecting surfaces could be used to reflect the image. For example, in case the image displayed on the second portion of the display is an inverted image then an odd number of reflections are required to display the image that is easily readable by the user. However, if the second image is in the same orientation as the first image then an even number of reflections are required to project the image such that it is easily readable by the user.

Further in some embodiments, the communication device also controls the projection of the second image by reflecting the second image an even number of times for a non-inverted projection and reflecting the second image an odd number of times for an inverted projection. For example, if the multiple reflecting surfaces include multiple mirrors, then the communication device may be able to control the number of times reflection is taking place by using a mechanism to add or remove a mirror.

In some other embodiments, the angular portion of the housing may be adjustable, for example, in cases where the reflecting surface is a mirror. In this case, it would be possible to change the angle of the mirror. The angle of the mirror could be any angle that reflects the image formed on the second portion of the display onto the top surface of the display of the communication device.

Figure 5:
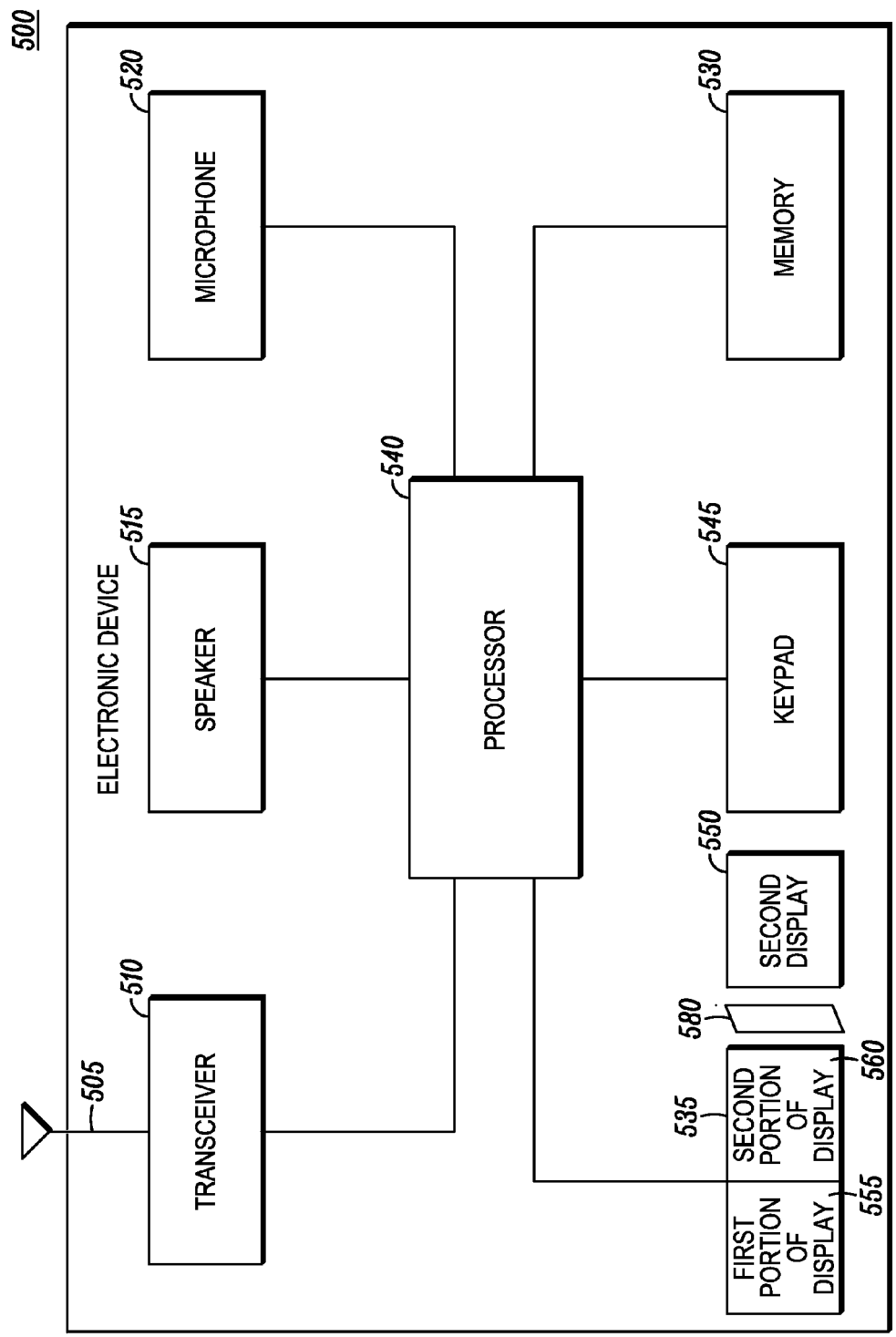
FIG. 5 is a block diagram of an electronic device in accordance with some embodiments.

FIG. 5 shows a block diagram of an electronic device 500 in accordance with an embodiment. Although the electronic device 500 is shown as a wireless communication device, the electronic device could be a computer (laptop, desktop, handheld, etc.), a personal digital assistant (with or without a wireless connection), a gaming console, or a wide variety of electronic devices with graphical user interfaces with or without physical buttons/keys.

The block diagram of the electronic device 500 includes a first display 535 and a second display 550 formed and operating in accordance with the various embodiments. For the purpose of example, electronic device 500 is shown as a radio further having a physical keypad 545, a microphone 520, a speaker 515, an antenna 505, a transceiver 510, a processor 540, reflecting surface 580, and a memory 530.

The first display 535 may be a standard (e.g., LCD, LED) electronic display or a touch display. The first display 535 includes two portions i.e. a first portion 555 and a second portion 560. The second portion 560 of the first display 535 is coupled to the first portion 555 of the first display 535. The second display 550 is a non-electronic display formed of a lens or a top surface of a prism. The image displayed on the second portion 560 of the first display 535 may be an image that is same as the image displayed on the first portion 555 of first display 535, an image that is an inverted image of the image displayed on the first portion 555 of the first display 535, an image containing information that is a subset of the information contained in the first portion 555 of the first display 535, or an image that is different from the image displayed on the first portion 555 of the first display 535. As seen in FIG. 5, one of the advantages of utilizing second non-electronic display 550 is that there is no need for any processor control of the device. The use of a lens or top surface of a prism allows the addition display to be utilized without incurring any extra processing power.

When embodied as a radio electronic device may comprise the microphone 520 the speaker 515, transceiver 510, and the antenna 505. The transceiver 510 combines the transmission and the reception capabilities of the electronic device 500. The processor 540 displays a first image on a first portion 555 of a first display 535 positioned on a first surface of the electronic device 500. After displaying the first image, the processor 540 displays a second image on a second portion 560 of the first display 535. The second image may correspond to or may be independent of the first image. The second image can be viewed at the second display 550 of the electronic device 500.

Further to displaying the second image by the processor, the second image is reflected by a reflecting surface 580 onto a second surface of the electronic device 500. The second image is reflected by positioning a reflecting surface 580 between the second portion 560 of the first display 535 and the second surface of the electronic device 500. As a result of the reflection, an image is displayed on the second display 550.

Thus, by using the various embodiments of the present invention a user is able to view an image displayed on the second surface 550 of the electronic device 500 without removing the electronic device 500 from the holster or the belt clip. The present invention also hel in reducing the design complexity as it uses only one electronic display 535, thereby eliminating the need to connect the second display 550 to the processor 540. Overall cost and design complexity are thus minimized.

Figure 6:
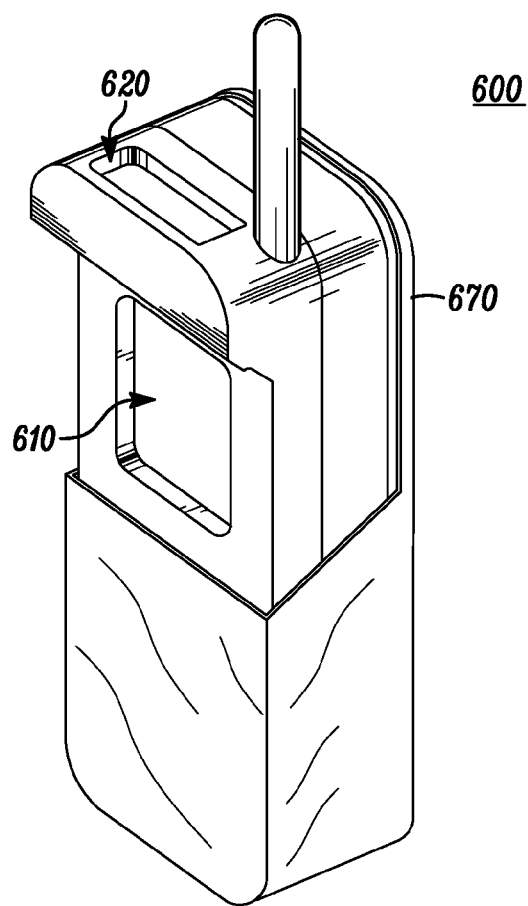
FIGS. 6-7 are communication devices in accordance with some embodiments.
Figure 7:
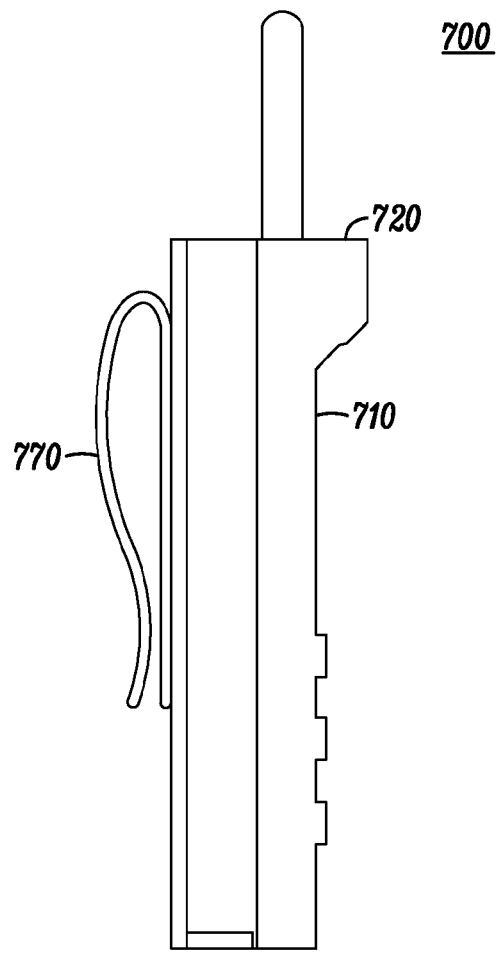

FIGS. 6-7 depict communication devices 600, 700 in accordance with some embodiments. FIG. 6 illustrates the communication device 600 seated within a holster 670. When an image is displayed on a first display 610, a user can view a corresponding image on a second display 620 without removing the communication device from the holster. Similarly, FIG. 7 illustrates a communication device 700 with a belt clip 770 coupled thereto. When an image is displayed on the first display 710, a user can view a corresponding image on a second display 720 without having to disengage the belt clip 770 from a belt.

The various embodiments of the present invention allows the images to be displayed on a communication device without removing or pulling the device from the holster or belt clip. Information can be viewed at a quick glance, which is particularly beneficial during mission critical tasks. The use of a non-electronic display apparatus provides a cost effective design approach without extra power or processor usage.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized controllers (or "controlling devices") such as microcontroller, customized controllers and unique stored program instructions (including both software and firmware) that control the one or more controllers to implement, in conjunction with certain non-controller circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject Those skilled in the art will appreciate that the above recognized advantages and other advantages described herein are merely exemplary and are not meant to be a complete rendering of all of the advantages of the various embodiments of the present invention.

We claim:

1. A method for displaying an image on a communication device, the method comprising:
    displaying a first image on a first portion of a display positioned on a first surface of the communication device;
    displaying a second image on a second portion of the display, wherein the second image corresponds to the first image; and
    reflecting the second image onto a second surface of the communication device by positioning a reflecting surface between the second portion of the display and the second surface of the communication device.

2. The method of claim 1, wherein the second image is an inverted image of the first image.

3. The method of claim 2, wherein reflecting the second image further comprises:
reflecting the second image an odd number of times so that the reflected image is an inverted image of the first image.

4. The method of claim 1, wherein the second image is same as the first image.

5. The method of claim 4, wherein reflecting the second image further comprises:
reflecting the second image an even number of times so that the reflected image is a noninverted image of the first image.

6. The method of claim 1, wherein the first portion of the display is visible through a front lens and the second portion of the display is enclosed by a housing.

7. The method of claim 1, wherein the reflecting surface includes at least one of a mirror and a prism.

8. The method of claim 7, wherein the second surface includes at least one of a lens and a portion of the prism.

9. The method of claim 1, wherein the second surface is a top surface of the communication device.

10. The method of claim 1, wherein the first surface includes the front surface of the communication device.

11. The method of claim 1 further comprising:
controlling a projection of the second image by reflecting the second image an even number of times for a non-inverted projection and reflecting the second image an odd number of times for an inverted projection.

12. An apparatus comprising:
a display having:
a first portion of the display configured to display a first image; and
a second portion of the display coupled to the first portion display configured to display a second image, wherein the second image corresponds to the first image;
an optical guide for reflecting the second image onto a second surface of the apparatus; and
a top lens coupled to the optical guide to display the reflected second image.

13. The apparatus of claim 12, wherein the top lens comprises a top portion of the optical guide.

14. The apparatus of claim 12, wherein the optical guide comprises:
an angular portion configured to reflect the second image onto the top lens.

15. The apparatus of claim 14, wherein the angular portion includes at least one reflecting surface positioned at a predefined angle that permits total internal reflection of the image displayed by the second portion of the display.

16. The apparatus of claim 12, wherein the apparatus is seated within a holster, the top lens being viewable without having to remove the apparatus from the holster.

17. The apparatus of claim 12, wherein the apparatus further comprises a belt clip coupled thereto, the top lens being viewable without having to disengage the belt clip.

18. A radio device, comprising:
a housing having a lens;
a liquid crystal display (LCD) is coupled to the housing; and
a prism-structure light guide positioned between the LCD and the lens of the housing, wherein the prism-structure light guide includes an angular portion for reflecting an image displayed by the LCD onto the prism-structure light guide thereby making the image viewable at the lens.

19. The radio device of claim 18, wherein the LCD further comprises:
a first portion configured to display a first image; and
a second portion coupled to the first portion of the display and configured to display a second image, wherein the second image corresponds to the first image.

20. The radio device of claim 19, wherein the angular portion includes at least one reflecting surface positioned at a predefined angle that permits total internal reflection of the image displayed by the second portion of the display.

21. The radio device of claim 20, wherein the first portion of the LCD is visible to a user through a front lens from a front surface and the second portion of the LCD is enclosed by the housing.

22. The radio device of claim 20, wherein the second portion of the LCD is visible to a user from a top surface.

23. The radio device of claim 21, wherein the LCD is present on a front surface of the radio device, the front lens is present on the front surface, and the lens of the housing is located on a top surface of the radio device.

24. The radio device of claim 18, wherein the radio device is seated within a holster, the lens being viewable without having to remove the radio device from the holster.

25. The radio device of claim 18, wherein the radio device further comprises a belt clip coupled thereto, the lens being viewable without having to disengage the belt clip.

26. A method for displaying an image on a housing of a communication device, the method comprising:
generating an image from a display onto a first surface of the housing; and
reflecting the image onto a second surface of the housing by positioning a reflecting surface between the display and the second surface of the housing, the image thereby being viewable on both the first and second surfaces of the housing.

27. The method of claim 26, wherein reflecting the image includes reflecting the image multiple times by multiple reflecting surfaces positioned between the display and the second surface of the housing.

28. The method of claim 26, wherein a portion of the display is enclosed by the housing.

29. The method of claim 26, wherein the reflecting surface includes at least one of a mirror and a prism.

30. The method of claim 29, wherein the second surface includes at least one of a lens and a portion of the prism.

31. The method of claim 26, wherein the second surface is a top surface of the communication device.

32. The method of claim 26, wherein the first surface includes the front surface of the communication device.

33. A communication device, comprising:
a housing having a plurality of surfaces;
a first display coupled to one of the plurality of surfaces, the first display under electronic control;
a reflecting device for reflecting an image from the first display; and
a second display, not under electronic control, for displaying the image provided by the reflecting device onto a second surface of the plurality of surfaces.

* * * * *

UNITED STATES PATENT AND TRADEMARK OFFICE
CERTIFICATE OF CORRECTION

PATENT NO. : 8,382,294 B2  
APPLICATION NO. : 12/771794  
DATED : February 26, 2013  
INVENTOR(S) : Hua et al.

Page 1 of 1

It is certified that error appears in the above-identified patent and that said Letters Patent is hereby corrected as shown below:

In the Specifications

In Column 1, Line 48, delete "is a communication device" and insert -- are communication devices --, therefor.

In Column 2, Line 14, delete "first image" and insert -- first image. --, therefor.

In Column 4, Lines 27-28, delete "Thus, the device of FIGS. 1A and 1B hel a user to" and insert -- Thus, the device of FIGS. 1A and 1B helps a user to --, therefor.

In Column 4, Lines 30-31, delete "This device also hel in reducing" and insert -- This device also helps in reducing --, therefor.

In Column 5, Line 43, delete "device The" and insert -- device. The --, therefor.

In Column 7, Lines 16-17, delete "The present invention also hel in reducing" and insert -- The present invention also helps in reducing --, therefor.

In Column 8, Line 46, delete "subject" and insert -- subject. --, therefor.

In the Claims

In Column 9, Line 11, in Claim 5, delete "noninverted" and insert -- non-inverted --, therefor.

In Column 9, Line 24, in Claim 11, delete "claim 1" and insert -- claim 1, --, therefor.

Signed and Sealed this  
First Day of October, 2013

Teresa Stanek Rea  
*Deputy Director of the United States Patent and Trademark Office*